(12) United States Patent
Eppich

(10) Patent No.: US 11,141,895 B2
(45) Date of Patent: Oct. 12, 2021

(54) SHAPING MACHINE AND METHOD OF OPERATING A SHAPING MACHINE

(71) Applicant: ENGEL AUSTRIA GmbH, Schwertberg (AT)

(72) Inventor: Stephan Eppich, Arbing (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 312 days.

(21) Appl. No.: 16/292,899

(22) Filed: Mar. 5, 2019

(65) Prior Publication Data

US 2019/0275718 A1    Sep. 12, 2019

(30) Foreign Application Priority Data

Mar. 7, 2018   (AT) .............................. A 50189/2018

(51) Int. Cl.
*B29C 45/32*    (2006.01)
*B29C 45/68*    (2006.01)
(Continued)

(52) U.S. Cl.
CPC ........ *B29C 45/561* (2013.01); *B29C 45/1744* (2013.01); *B29C 45/1773* (2013.01); *B29C 45/1777* (2013.01); *B29C 45/18* (2013.01); *B29C 45/2602* (2013.01); *B29C 45/27* (2013.01); *B29C 45/322* (2013.01); *B29C 45/47* (2013.01); *B29C 45/572* (2013.01); *B29C 45/66* (2013.01); *B29C 45/67* (2013.01)

(58) Field of Classification Search
CPC ....... B29C 45/12; B29C 45/20; B29C 45/322; B29C 2045/451; B29C 2045/5615; B29C 45/32; B29C 45/67; B29C 45/68; B29C 2045/561; B29C 2045/564; B29C 2045/5665; B29C 2045/665; B29C 2045/675; B29C 2045/683; B29C 2045/688

See application file for complete search history.

(56) References Cited

U.S. PATENT DOCUMENTS 5,382,158 A    1/1995    Herbst
5,714,180 A *  2/1998    Lampl .................... B29C 45/12
                                                     425/589

(Continued)

FOREIGN PATENT DOCUMENTS

DE              42 19 924       12/1993
DE        10 2005 047 995        3/2009

(Continued)

*Primary Examiner* — Robert B Davis
*Assistant Examiner* — Thu Khanh T Nguyen
(74) *Attorney, Agent, or Firm* — Wenderoth, Lind & Ponack, L.L.P.

(57) ABSTRACT

A shaping machine includes a stationary first mold mounting plate, a second mold mounting plate movable with respect to the first mold mounting plate, a tubular snorkel fixedly secured to the second mold mounting plate, and an injection unit for plasticizing and injecting a molding material. An abutment is designed so that, in the opened condition of the closing unit, the injection unit can be braced against the abutment, and so that, in a closed condition of the closing unit, the injection unit is freed from the abutment by the force action of the snorkel on the injection unit.

23 Claims, 12 Drawing Sheets

(51) Int. Cl.
   *B29C 45/56*   (2006.01)
   *B29C 45/17*   (2006.01)
   *B29C 45/18*   (2006.01)
   *B29C 45/26*   (2006.01)
   *B29C 45/27*   (2006.01)
   *B29C 45/47*   (2006.01)
   *B29C 45/57*   (2006.01)
   *B29C 45/66*   (2006.01)
   *B29C 45/67*   (2006.01)

(56)   References Cited

U.S. PATENT DOCUMENTS

| | | | |
|---|---|---|---|
| 10,857,712 | B2 | 12/2020 | Buzzo Titella |
| 11,059,210 | B2* | 7/2021 | Pacios Rivera ......... B29C 45/68 |
| 2006/0003048 | A1* | 1/2006 | Jaroschek ............... B29C 45/12 |
| | | | 425/572 |
| 2006/0182842 | A1* | 8/2006 | Pruden ................ B29C 45/2806 |
| | | | 425/568 |
| 2008/0265465 | A1* | 10/2008 | Glaesener ............ B29C 45/561 |
| | | | 264/328.1 |
| 2018/0222099 | A1 | 8/2018 | Grange et al. |

FOREIGN PATENT DOCUMENTS

| | | |
|---|---|---|
| DE | 10 2015 112 508 | 2/2017 |
| JP | 8-118403 | 5/1996 |
| JP | 2013-82158 | 5/2013 |
| JP | 2015-44392 | 3/2015 |

* cited by examiner

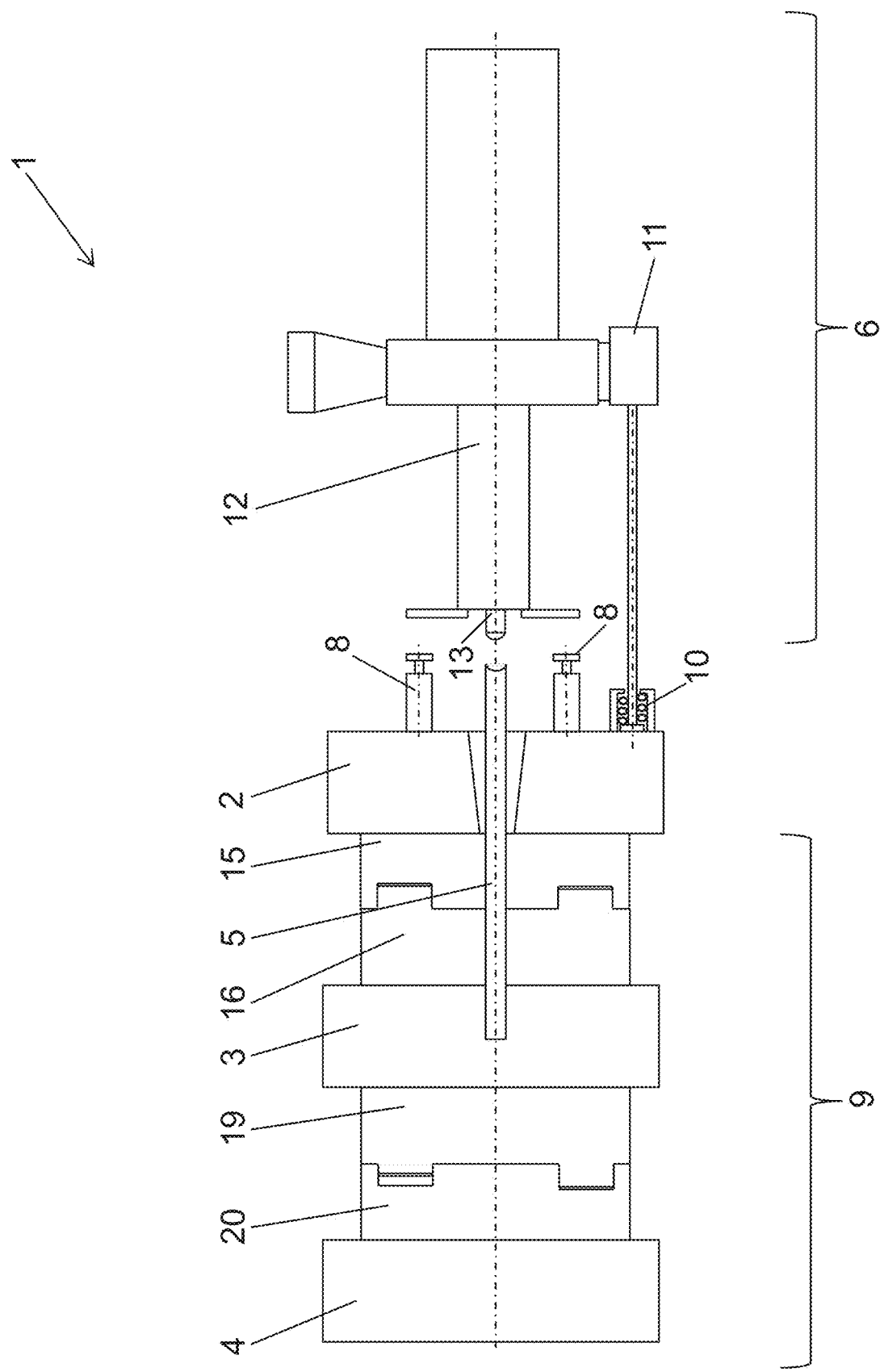

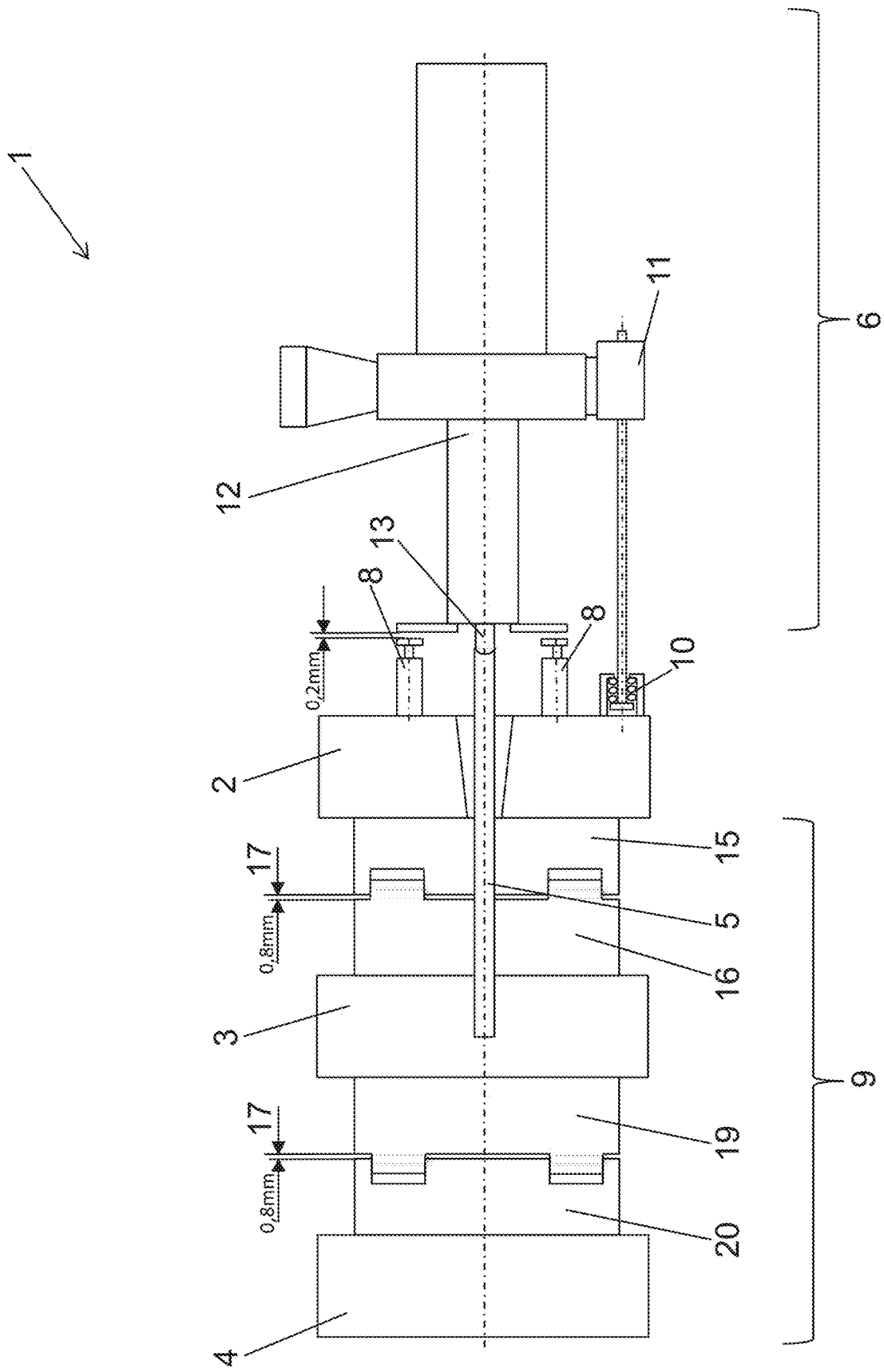

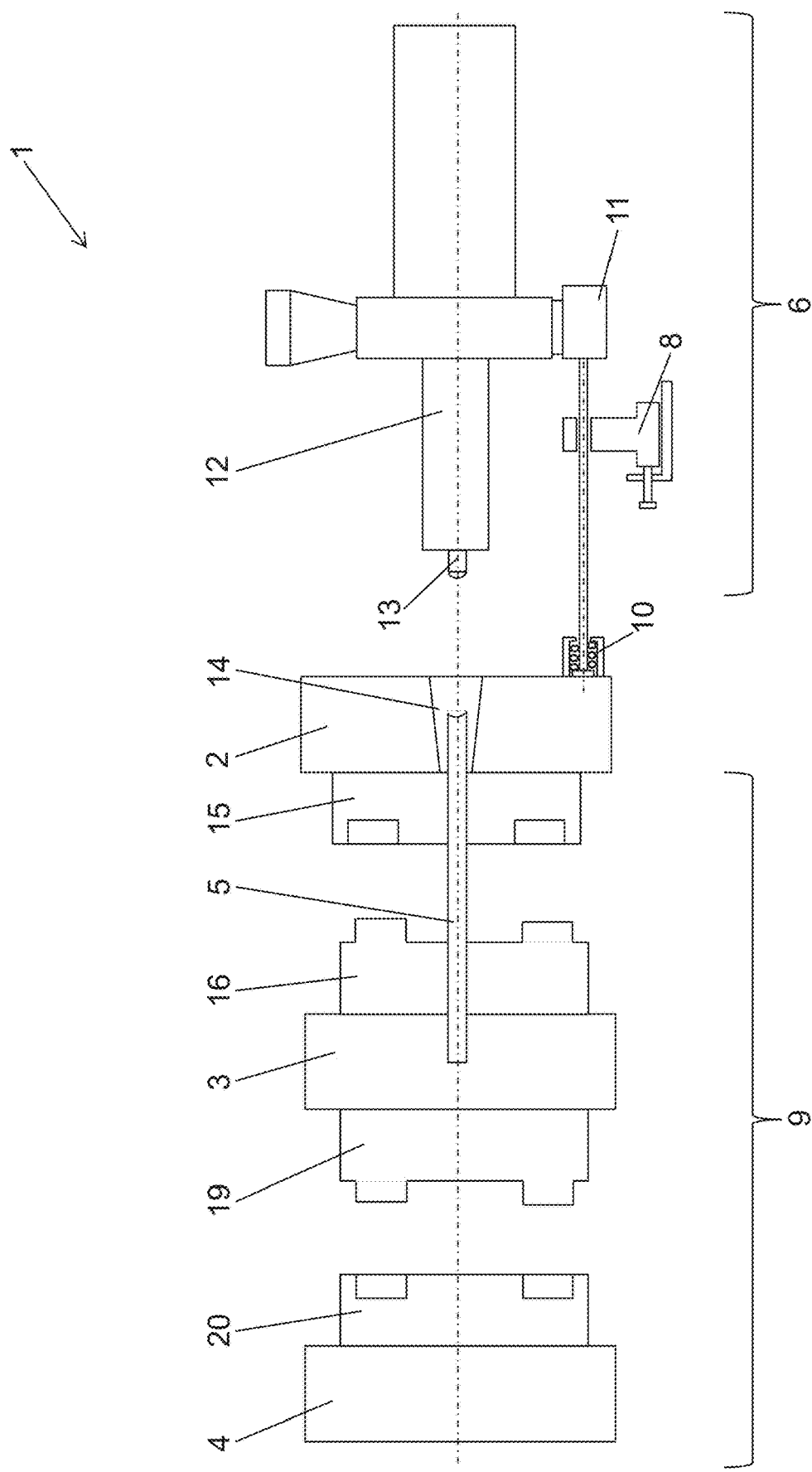

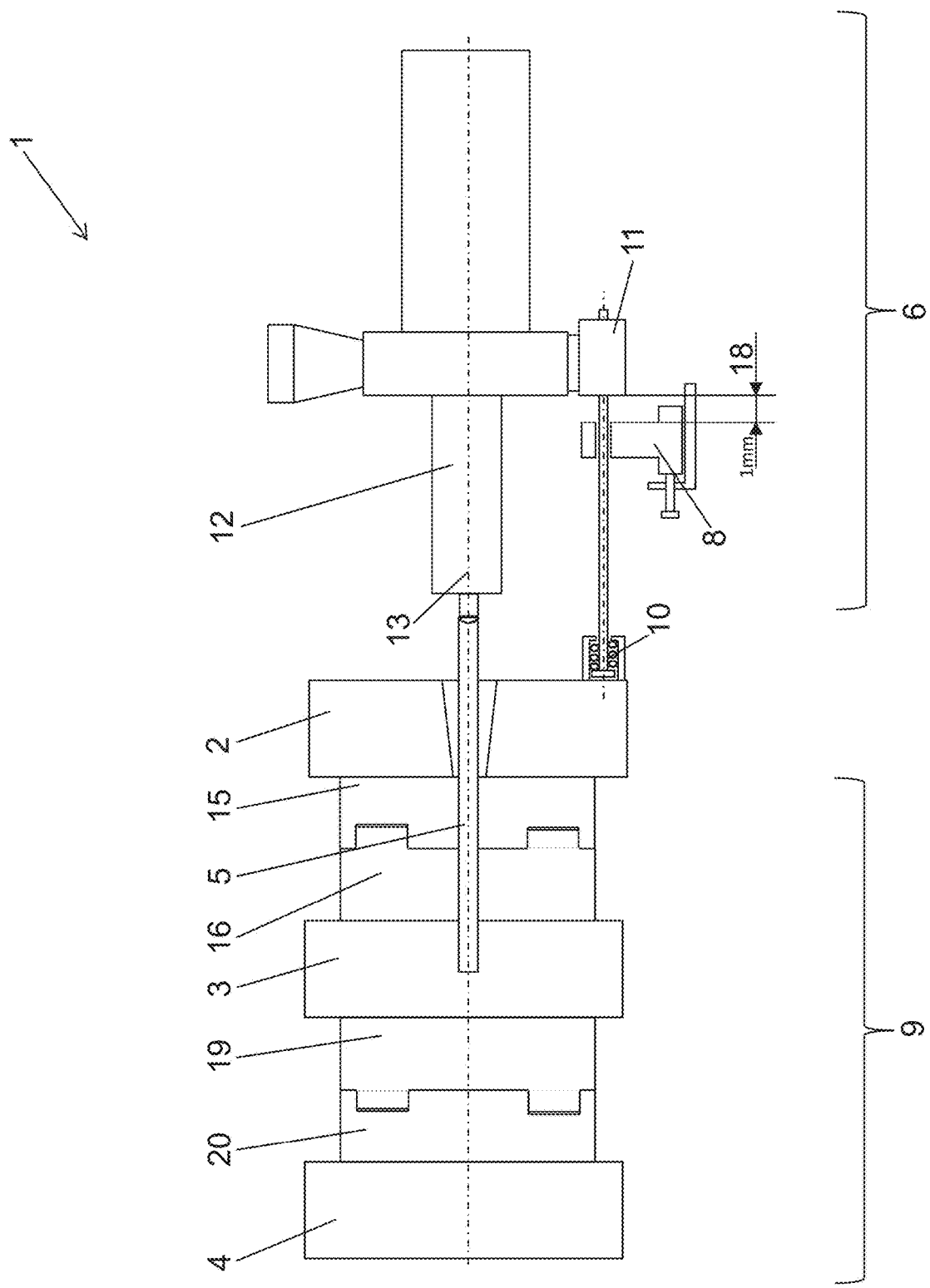

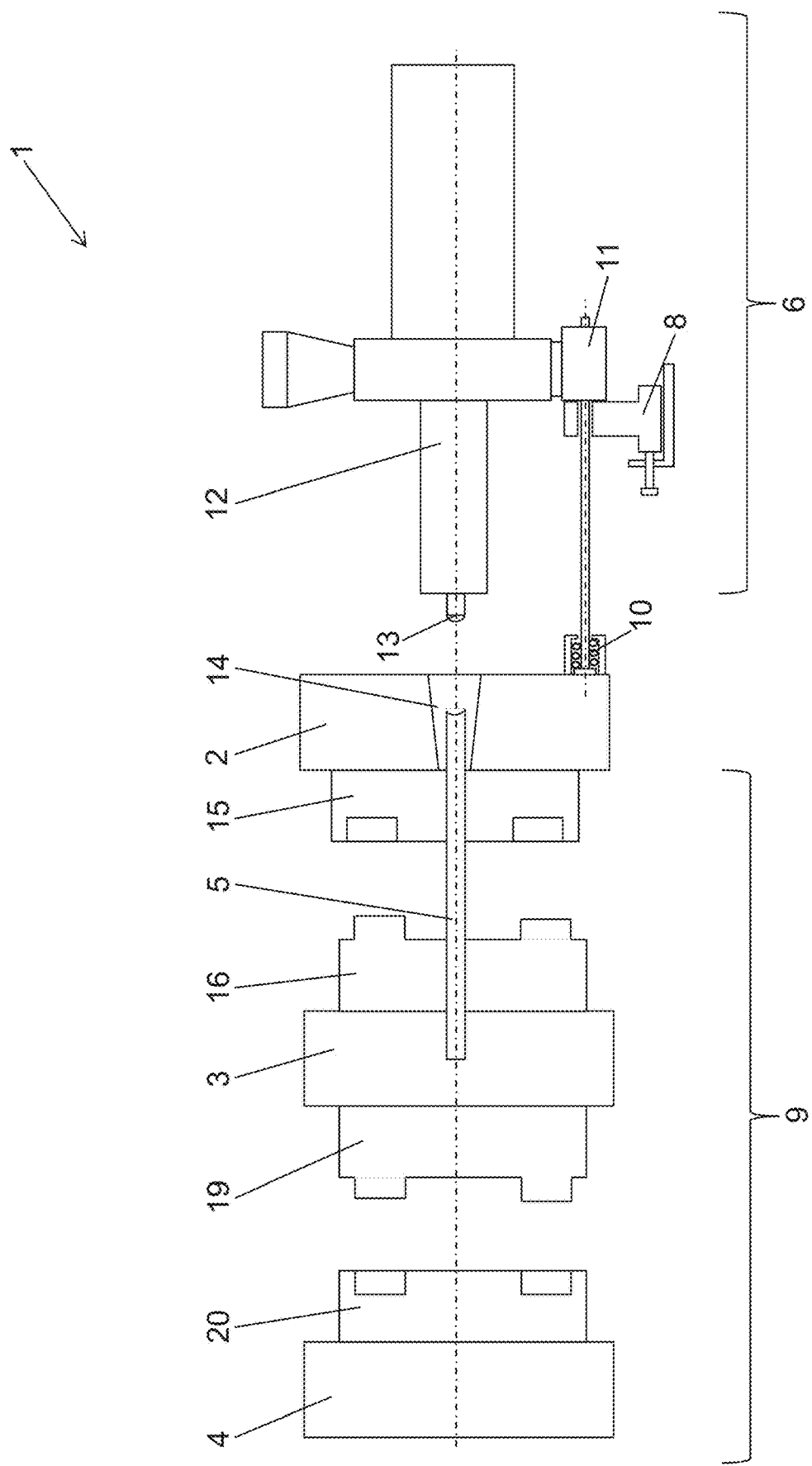

SHAPING MACHINE AND METHOD OF OPERATING A SHAPING MACHINE

BACKGROUND OF THE INVENTION

The present invention concerns a shaping machine and a method of operating a shaping machine. The term shaping machine is used to denote injection molding machines, transfer presses, presses and the like.

It is known from the state of the art in relation to shaping machines comprising a first stationary mold mounting plate and a second mold mounting plate which is movable relative to the first mold mounting plate to supply a molding material to a mold tool by way of the second mold mounting plate, wherein the mold tool is fixed between the first and second mold mounting plates. In general the injection unit for plasticizing and injecting a molding material is provided at a side of the first mold mounting plate, facing away from the second mold mounting plate. If however injection is wanted from the second mold mounting plate (for example because the second mold mounting plate is a central plate) a tubular snorkel is used in order to pass the plasticized molding material which is to be injected from the injection unit to the second mold mounting plate. That tubular snorkel is for the most part fixedly secured to the second mold mounting plate.

Such systems which are known from the state of the art and in which a molding material is fed by way of a movable mold mounting plate are used in relation to so-called stack mold tools or also referred to as tools having a plurality of separating planes. The stack mold tool usually comprises a plurality of tool portions, namely:
- a mold tool portion fixed on the stationary first mold mounting plate of a shaping machine,
- a mold tool portion fixed on a movable further mold mounting plate, and
- one or more mold mounting plates secured to a movable second mold mounting plate, wherein the second mold mounting plate is usually arranged between the first and the further mold mounting plates and is often also referred to as the central plate.

In order in relation to such stack mold tools to pass the plasticized molding material to be injected to a central plate—hereinafter also referred to as the second mold mounting plate—a tubular snorkel is used, which is secured to the second mold mounting plate. That snorkel passes the plasticized molding material to be injected from an injection unit to the central plate, the central plate passing the molding material to the mold tool portions which are secured to the central plate.

Such a stack mold tool (also referred to as a tool having a plurality of separating planes) is known for example from DE 10 2005 047 995 B4, that specification describing a method for carrying out an embossing or stamping process with a stack mold tool.

In order to be able better to fill thin-wall moldings with improved orientation and internal stress properties in respect of the moldings and/or to achieve complicated injection and holding-pressure processes in the production of thick-wall moldings and/or to produce moldings which are substantially free of internal stresses it may be necessary to carry out so-called injection stamping with a stack mold tool, often also only referred to as stamping in this context. The stamping operation is known in various different configurations from the state of the art and therefore does not need to be described in greater detail at this juncture. The important consideration in injection stamping with stack mold tools is that for example a nozzle of the injection unit is pressed against the snorkel in order to feed a plasticized molding material to the snorkel although the snorkel is still being displaced during the stamping movement in the direction of the injection unit. The pressing force against the snorkel should remain as uniform as possible during the stamping operation. In the event of an excessive loading on the snorkel it could be damaged or the second mold mounting plate (at which the snorkel is arranged) of the stack mold tool could experience a displacement in position. Various possibilities are known from the state of the art for solving that problem.

A first variant known from the state of the art provides that the injection unit is preloaded against the snorkel by a spring element before the stamping stroke movement is performed. During the stamping stroke movement the snorkel is now further moved in the direction of the injection unit, whereby the injection unit is pressed away from the stationary first molding plate by the snorkel, wherein that relative movement between the injection unit and the stationary first mold mounting plate is compensated by the spring element, by the spring element being further stressed. The injection unit is still held against the snorkel by that further stressing of the spring element. Upon opening of the closing unit the snorkel is now moved away from the injection unit whereby the spring element is relieved of stress. A disadvantage here is that, in any shaping cycle of the shaping machine the above-mentioned spring element is completely relieved of stress, which has an adverse effect on the service life of the spring element.

A further disadvantage in regard to the spring element being completely relieved of stress is that, upon closure of the tool, the tool is usually firstly closed at a high closing speed and shortly before the individual mold tool portions meet that closing movement is continually reduced until the mold tool portions meet or are only still positioned relative to each other with the intended stamping gap. If now the snorkel is moved at a higher drive speed to the injection unit an impact continually occurs upon each closure of the shaping machine, which also has an adverse effect on the service life of the components and possibly results in deformation thereof. To avoid that the speed of the second mold mounting plate together with the snorkel had to be reduced at an earlier time, which would prolong the cycle time.

A further variant is disclosed by DE 10 2015 112 508 A1. That describes the provision of a telescopic region of the snorkel or a nozzle of an injection unit. In that way the telescopic region of the snorkel or the nozzle can be biased against the respective counterpart portion by a spring element. When the stamping stroke movement is carried out the telescopic region can be displaced into each other or the spring element can be further stressed in order to provide for compensation of the stamping stroke movement. By virtue of such a configuration it is possible for the injection unit to be provided fixedly on the machine frame of the shaping machine, in other words the injection unit can be secured at a fixedly defined spacing relative to the stationary first mold mounting plate. A disadvantage here however is that the nozzle or the snorkel is filled with molding material while they compensate for the stamping stroke. This means that the telescopic region is pushed into each other by the stamping stroke and thus the volume of the tubular telescopic region is reduced, whereby the molding material disposed therein is either ejected (which in use however is not possible as the cavity provided by the mold tool portions is already completely filled and a reverse flow into the injection unit is not possible) or the molding material is subjected to an additional pressure. That substantial increase in the pressure of the molding material in turn confronts the designer with the task of sealing off the components in regard to unwanted discharge of the molding material, and that cannot be resolved in a trivial fashion in regard to the high pressure which occurs.

SUMMARY OF THE INVENTION

Taking that state of the art as the basic starting point, the object of the invention is to provide a shaping machine and/or a method of operating a shaping machine, which are of and/or allow a simplified and/or less complicated structure. That object is attained by a shaping machine and a method of operating a shaping machine as described below.

According to the invention, at least one abutment is so designed that in the opened condition of the closing unit the injection unit can be braced against the at least one abutment and that in a closed condition of the closing unit the injection unit is freed from the at least one abutment by the force action of the at least one snorkel on the injection unit.

The term closed condition of the closing unit is intended to denote a condition in which injection of a molding material into a mold tool secured between the first and the second mold mounting plates is effected or can be effected. In a closed condition the mold tool portions of the mold tool bear against each other or have only a small gap relative to each other so that upon injection of molding material into the cavity provided by the mold tool portions no molding material at all can issue from the cavity through the gap. In a subsequent stamping method in known fashion a stamping gap is maintained between the mold tool portions upon injection of the molding material, which gap is reduced after injection of the molding material or also closed. The term opened condition of the shaping machine is used to denote a condition in which the first and the second mold mounting plates are spaced from each other at least to such an extent that there is sufficient space between them, more precisely between the mold tool portions secured thereto, that a finished product can be removed or sufficient space is formed to carry out possible working operations between the mold mounting plates.

Such a configuration according to the invention provides that there is always a preloading in respect of the injection unit. In an opened condition of the closing unit that preloading is applied in relation to the at least one abutment and in a closed condition of the closing unit that preloading is in relation to the snorkel. As a consequence thereof the bracing of the injection unit is never entirely removed, whereby the elements affording the preloading are never entirely relaxed during a shaping cycle of the shaping machine, which in turn markedly enhances the service life of those wearing components.

In addition, the abutment is so designed that in a closing movement of the closing unit of the shaping machine the snorkel liberates the injection unit from at least one abutment with a slight advance movement (speed), which slight advance movement of the tubular snorkel which is fixedly secured to the second mold mounting plate occurs shortly before the mold tool portions meet or shortly before the intended stamping gap is attained.

Preferably, there is provided a further mold mounting plate movable with respect to the first mold mounting plate or the second mold mounting plate. Particularly preferably, the second mold mounting plate is arranged between the first mold mounting plate and the further mold mounting plate. In such a configuration, the movable second molding mounting plate is often referred to as the central plate. It is certainly also conceivable to provide still further movable mold mounting plates and thus to enlarge such a tool (also referred to as a stack mold tool) as desired.

It can advantageously be provided that the injection unit is biased by force actuation by at least one spring element. In that case, the at least one spring element can be for example in the form of a mechanical and/or hydraulic spring element. Variants by way of example of such a spring element would accordingly be either a mechanical coil or leaf spring or a hydraulic pressure storage means.

The at least one abutment can be provided at the first mold mounting plate. In that respect, it is definitely conceivable that the at least one abutment is of a bar-shaped configuration at a side of the first mold mounting plate, that faces away from the second mold mounting plate. In a variant of a corresponding configuration by way of example it can be provided in that respect that the at least one abutment is of a multi-part—preferably two-part—configuration, wherein a length of the at least one abutment is variable by a relative movement of the plurality of parts relative to each other. Thus it is possible for example for the plurality of portions to be secured together by a screw connection, in which case relative rotation of one of the plurality of portions leads to an increase or a reduction in the length of the abutment. Those measures in themselves or also in total respectively provide a particularly simple design option.

Preferably, the injection unit is movable by a drive unit—preferably a spindle drive—relative to the first mold mounting plate. However, other drive units known from the state of the art are also certainly conceivable like for example linear motors or fluid-mechanical drives. The at least one spring element can be acted upon with a force by the drive unit of the injection unit.

Preferably, the injection unit is embodied by an axially and rotatably movable plasticizing screw, the plasticizing screw being arranged in a plasticizing cylinder. In a preferred variant, in the opened condition of the closing unit, the injection unit can be braced directly or indirectly with the plasticizing cylinder against the at least one abutment. Other design configurations however are also perfectly conceivable like for example an axially movable injection and plasticizing cylinder.

Preferably, the injection unit has at least one injection nozzle, wherein the at least one injection nozzle can be braced against the at least one snorkel.

The at least one snorkel can also project into an opening in the first mold mounting plate. However it is also perfectly conceivable that the plasticizing unit projects through an opening in the first molding mounting plate or the snorkel and the plasticizing unit contact each other in an opening in the first molding mounting plate. An arrangement parallel to the machine axis and/or outside the shaping machine is in principle conceivable.

A method of operating a shaping machine includes:
  in an opened condition of the closing unit the injection unit is braced against least one abutment,
  the closing unit is closed by displacement of a second mold mounting plate in the direction of the first mold mounting plate, and
  upon closure of the closing unit the injection unit is lifted off the at least one abutment by force action of at least one tubular snorkel arranged at the second mold mounting plate on the injection unit.

Preferably in that respect, upon closure of the closing unit at least one tubular snorkel arranged at the second mold mounting plate is introduced into an opening in the first mold mounting plate.

Preferably, upon opening of the closing unit the second mold mounting plate together with the at least one snorkel is moved in a direction facing away from the first mold mounting plate whereby the biased injection unit which is lifted off the at least one abutment is moved in the direction of the first mold mounting plate until the injection unit contacts the at least one abutment.

In a shaping cycle of the shaping machine starting from an opened condition of the closing unit:
  the second mold mounting plate is closed in the direction of the first mold mounting plate by means of the closing unit, and
  with the closing unit closed molding material is passed by means of the injection unit by way of the at least one snorkel arranged at the second mold mounting plate to a mold tool arranged at the first mold mounting plate and at the second mold mounting plate.

In that respect, it is certainly possible that molding material is passed directly to a mold tool by the at least one snorkel or is passed further on by a hot runner system.

Preferably also, via the closing unit prior to the feed of plasticized molding material, a mold tool portion arranged at the second mold mounting plate is positioned with a stamping gap relative to a mold tool portion arranged at the first mold mounting plate. Particularly preferably it can be provided in that respect that a width of the stamping gap is selected to be between 1.6 mm and 0.2 mm, preferably between 1.2 mm and 0.6 mm and particularly preferably between 0.9 mm and 0.7 mm.

In a further embodiment it can be provided that after the feed of plasticized molding material the second mold mounting plate is moved in the direction of the first mold mounting plate by the closing unit, preferably until the mold tool portion arranged at the second mold mounting plate bears against a mold tool portion arranged at the first mold mounting plate. Such a procedure is also known as stamping or injection stamping.

In a preferred embodiment of a method according to the invention, first at least one abutment arranged at a side of the first mold mounting plate, that faces away from the second mold mounting plate, is set, including the following method steps:
  closing the closing unit until a mold tool portion arranged at the second mold mounting plate bears against a mold tool portion arranged at the first mold mounting plate, preferably under the actuating effect of a closing force,
  adjusting a gap dimension between the at least one abutment and the injection unit with the mold tool portions in contact by the length of the at least one abutment being altered, and
  opening the closing unit.

Particularly preferably it can be provided that the gap dimension is up to 0.4 mm, preferably between 0.1 mm and 0.3 mm, particularly preferably 0.2 mm—preferably plus an intended stamping gap.

BRIEF DESCRIPTION OF THE DRAWINGS

Further details and advantages of the invention are discussed more fully hereinafter by the specific description with reference to the embodiments by way of example illustrated in the Figures, in which:

FIGS. 2a-2c show adjustment of an abutment of the FIG. 1 embodiment, FIGS. 3a-3d show a shaping cycle of the FIG. 1 embodiment FIG. 4 shows a second embodiment of a shaping machine according to the invention, and FIGS. 5a-5c show adjustment of an abutment of the FIG. 1 embodiment.

DETAILED DESCRIPTION OF THE INVENTION

Figure 1:
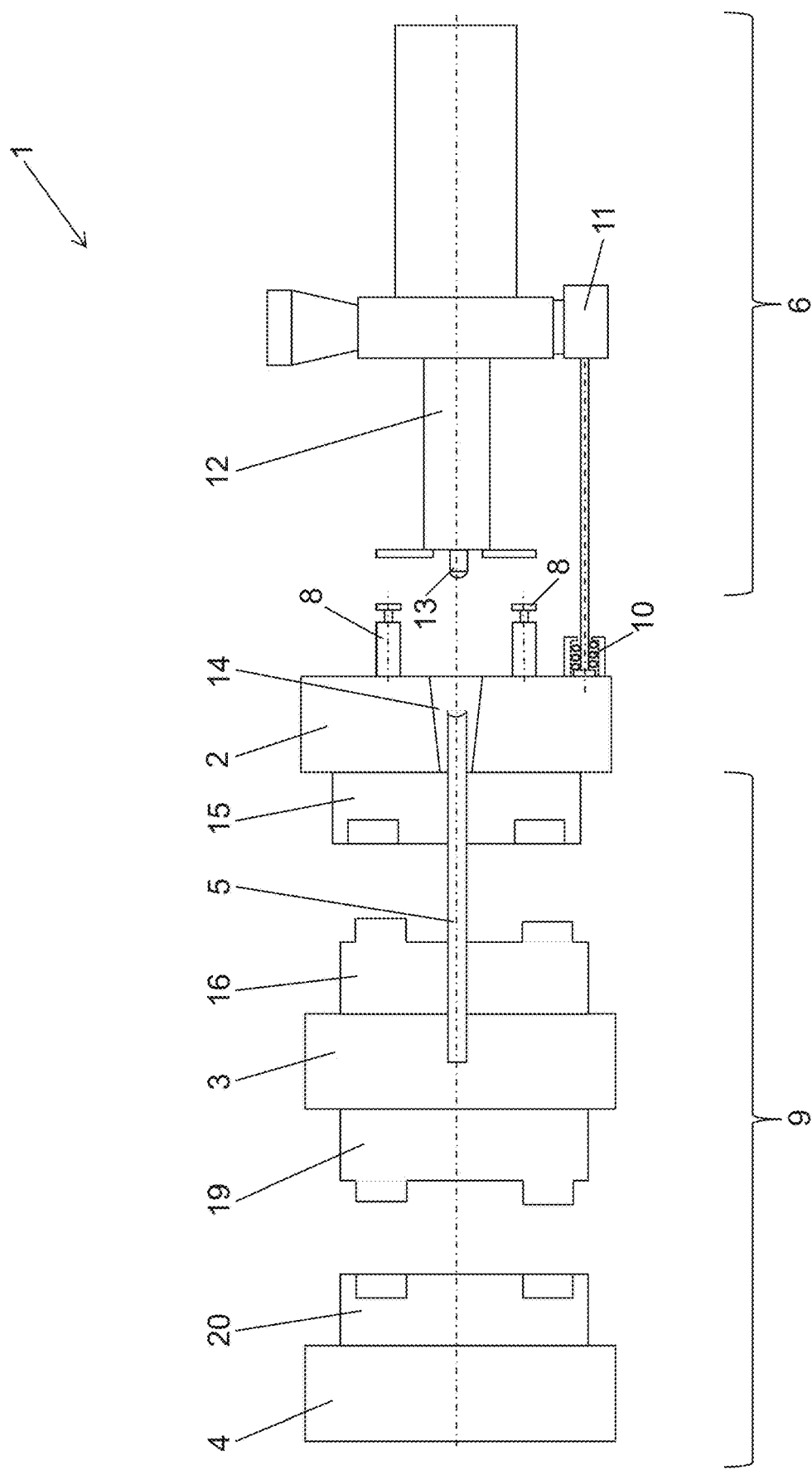
FIG. 1 shows a first embodiment of a shaping machine according to the invention.

FIG. 1 shows a first embodiment of a shaping machine 1 according to the invention. That shaping machine 1 has a closing unit 9 (which can be driven by means of a drive (not shown)) and an injection unit 6. In that arrangement the stationary first mold mounting plate 2 is fixedly connected to the machine frame (also not shown here for the sake of clarity). Secured to the stationary first mold mounting plate 2 is a mold tool portion 15 whose counterpart portion—the mold tool portion 16—is secured to a movable second mold mounting plate 3. A further mold tool portion 19 is further secured to the second mold mounting plate 3, the counterpart portion of the mold tool portion 19—the mold tool portion 20—being secured to a further mold mounting plate 4. Provided at the second mold mounting plate 3 is a snorkel 5 fixedly connected to the second mold mounting plate 3. Subsequently by way of that snorkel 5 a plasticized molding material coming from an injection unit 6 can be fed to the second mold mounting plate 3 which can pass the plasticized molding material 7 to the mold tool portions 16, 19 by way of internal conduits.

The snorkel 5 projects with its free end into an opening 14 in the first mold mounting plate 2. In this embodiment there are two abutments 8 at the side of the first molding mounting plate 2, facing away from the mold tool portion 15.

In this embodiment the injection unit 6 has a drive unit in the form of a spindle drive. That spindle drive is secured to the first mold mounting plate 2 by way of the spring element 10. In addition the injection unit 6 has a plasticizing cylinder 12 which can be brought into communication with the snorkel 5 by means of an injection nozzle 13.

Figure 2B:
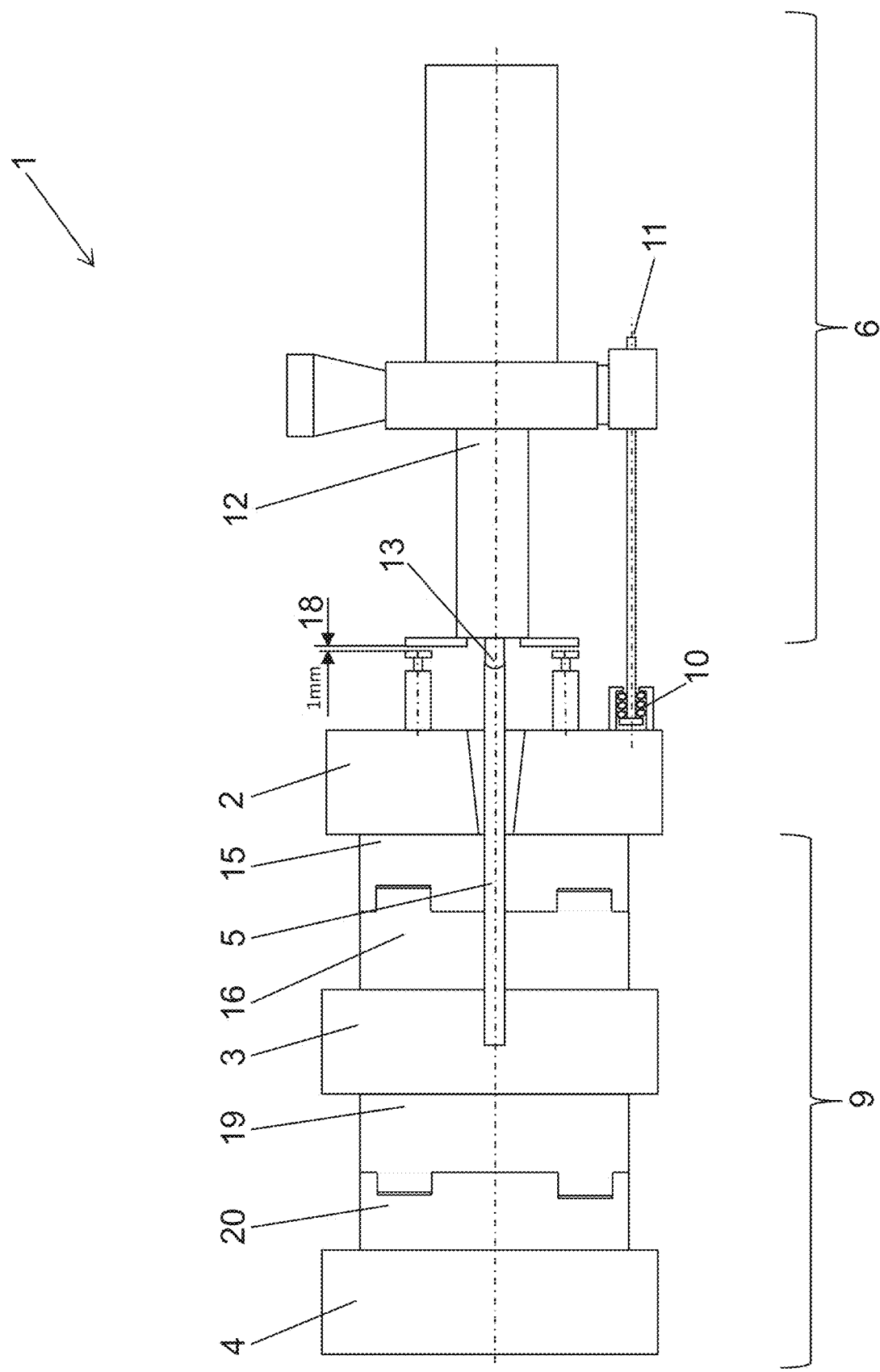
Figure 2C:
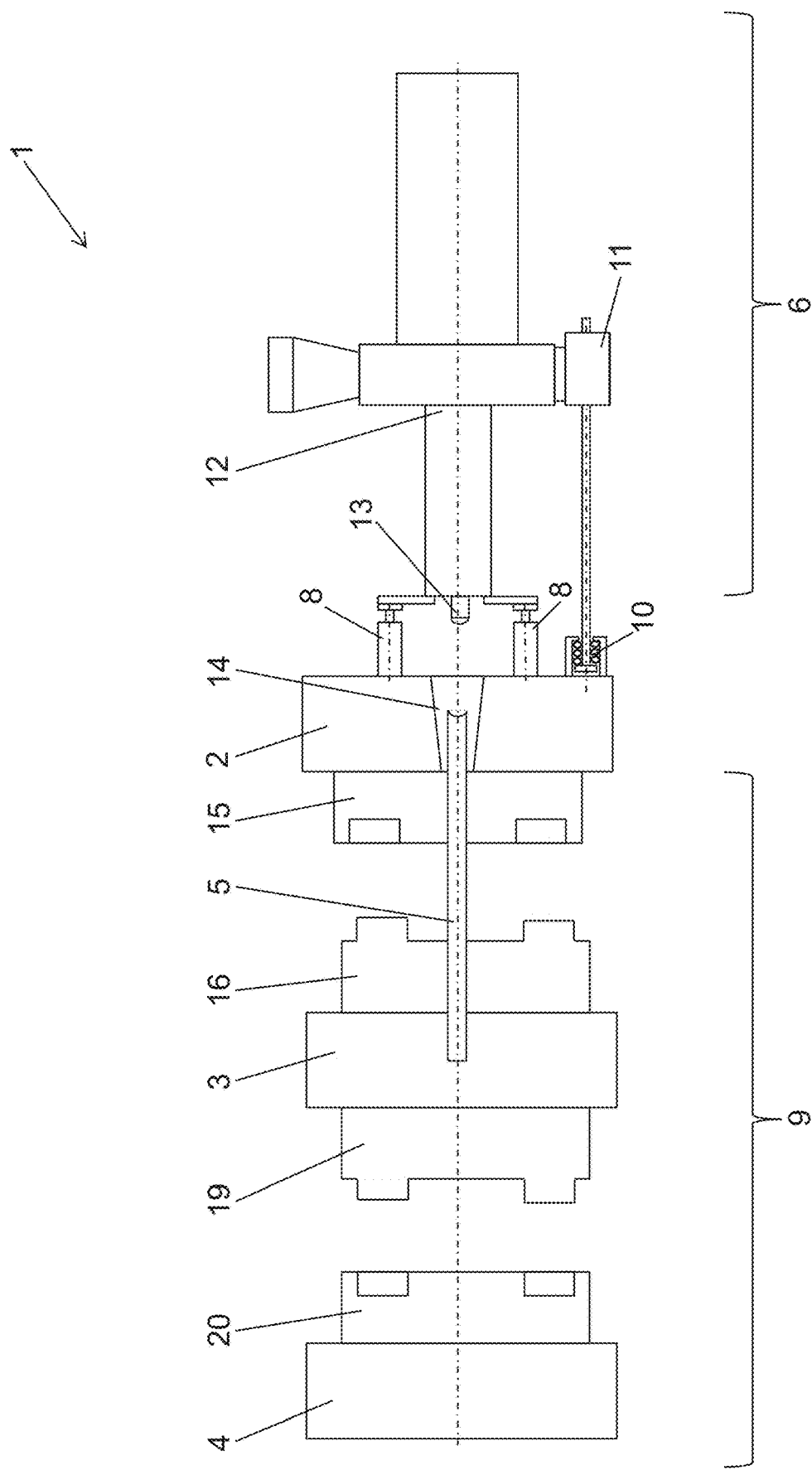

FIGS. 2a through 2c show adjustment of an abutment of the embodiment of FIG. 1. In that case in a first method step (shown in FIG. 2a) the closing unit 9 is closed until a mold tool 16 arranged at the second mold mounting plate 3 bears against a mold tool 15 arranged at the first mold mounting plate 2 and until a mold tool portion 20 arranged at the further mold mounting plate 4 bears against a mold tool portion 19 arranged at the second mold mounting plate 3, as shown in FIG. 2a. In addition a closing force can be built up, as can occur for example at the end of a stamping method. It can be clearly seen by the mold tool portions 20, 19 and the mold tool portions 16, 15 bearing against each other. The injection unit 6 however is always still in a contact-less condition relative to the first mold mounting plate 2, in which case the spring element 10 is released and is without any biasing effect.

In a second method step (see FIG. 2b) the injection unit 6 is now moved by means of its drive unit 11 in the direction of the first mold mounting plate 2 until the injection unit 6 bears with its injection nozzle 13 against the snorkel 5 and the spring element 10 is stressed to a predetermined value. The abutments 8 are then oriented with a gap dimension 18 relative to the injection unit 6. In this respect the abutments 8 in this embodiment are variable in length by being of a two-part configuration. Thus those two-part abutments 8 can be screwed into each other to adjust the length of the abutments 8. The gap dimension 18 in this embodiment is selected at 1 mm, wherein the gap dimension 18 is composed of a safety margin value of 0.2 mm plus an intended stamping gap 17 of 0.8 mm for a later stamping cycle.

In a third method step (see FIG. 2c) the closing unit 9 is opened again, in which case now the injection unit 6 bears against the pre-adjusted abutments 8. As the snorkel 5 was moved away from the injection nozzle 13 by opening of the closing unit 9 the injection unit 6 is thus no longer lifted off the abutments 8 by the snorkel 5. The snorkel 5 is moved away from the injection unit 6 by the opening movement of the closing unit 9 as same is fixedly connected to the second mold mounting plate 3, through the opening 14 in the first mold mounting plate 2. With opening of the closing unit 9 the adjustment method of the first embodiment of a shaping machine 1 according to the invention ends and the shaping cycle of the shaping machine 1 can begin, this being shown by FIGS. 3a through 3d.

In a first step (as shown in FIG. 3a) in that case the closing unit 9 of the shaping machine 1 is closed until the mold tool portions 19, 20 and the mold tool portions 15, 16 are only still spaced relative to each other with a stamping gap 17. In this specific embodiment there is a stamping gap of a size of 0.8 mm. By virtue of closure of the closing unit 9 the snorkel 5 is moved by the second mold mounting plate 3 towards the injection nozzle 13 of the injection unit 6 and the injection unit 6 is freed from the abutments 8 by the force action of the snorkel 5 on the injection nozzle 13.

An impact against the injection nozzle 6 is avoided by virtue of the fact that the abutments 8 position the injection unit 6 in such a way that the injection nozzle 13 and the snorkel 5 meet only when the speed of the second mold mounting plate 3 is already markedly reduced.

Figure 3B:
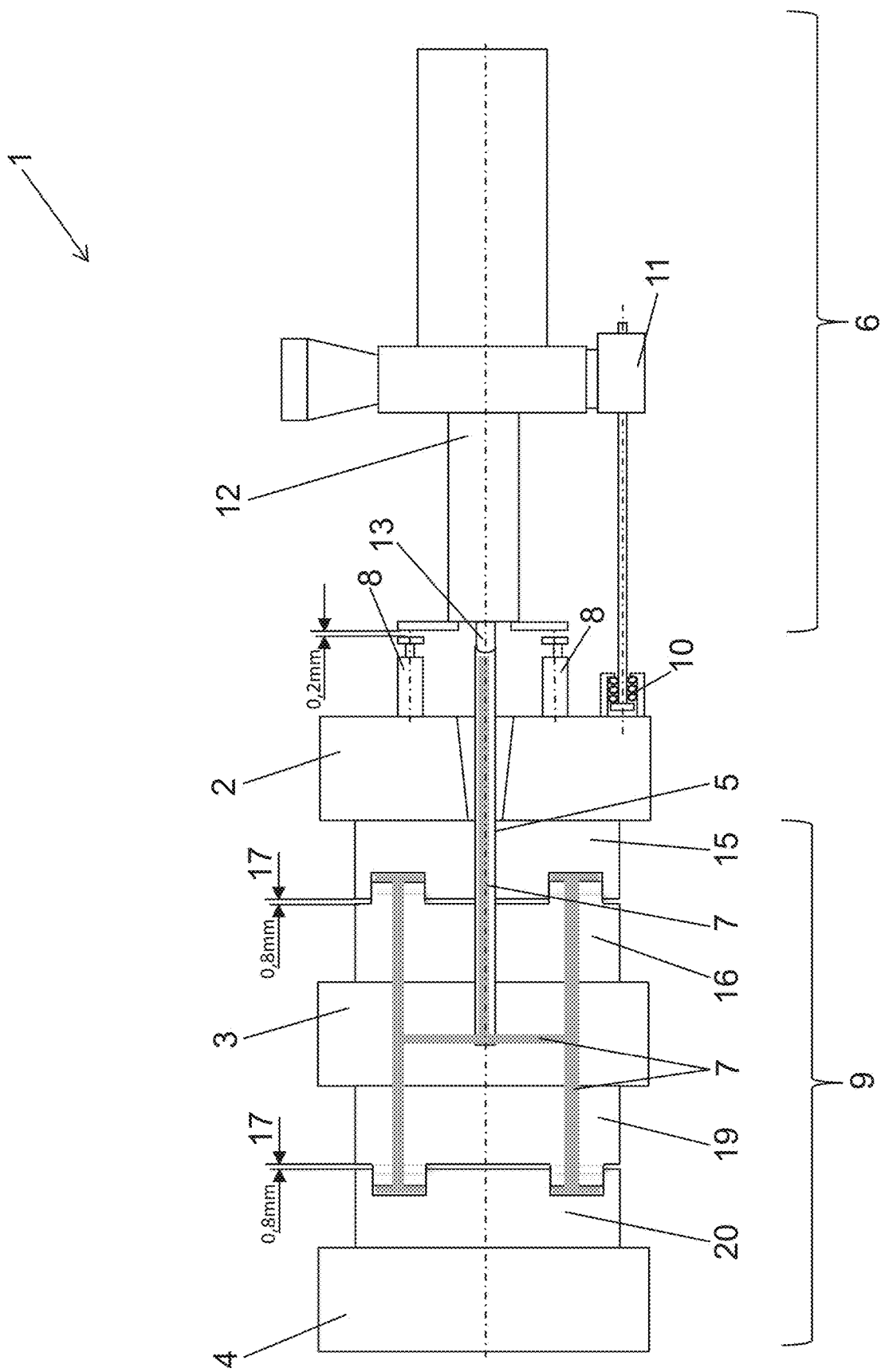
Figure 3C:
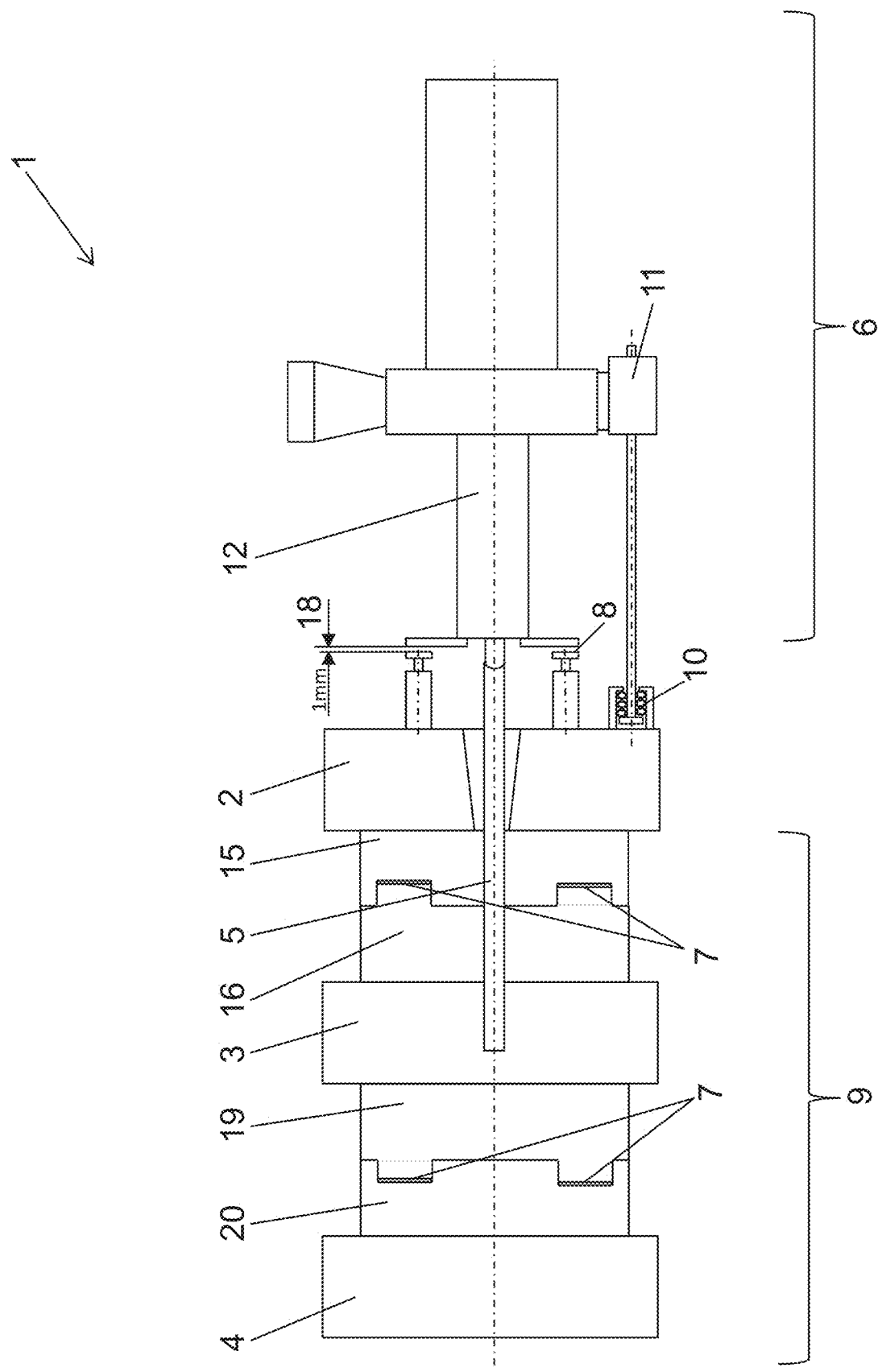
Figure 3D:
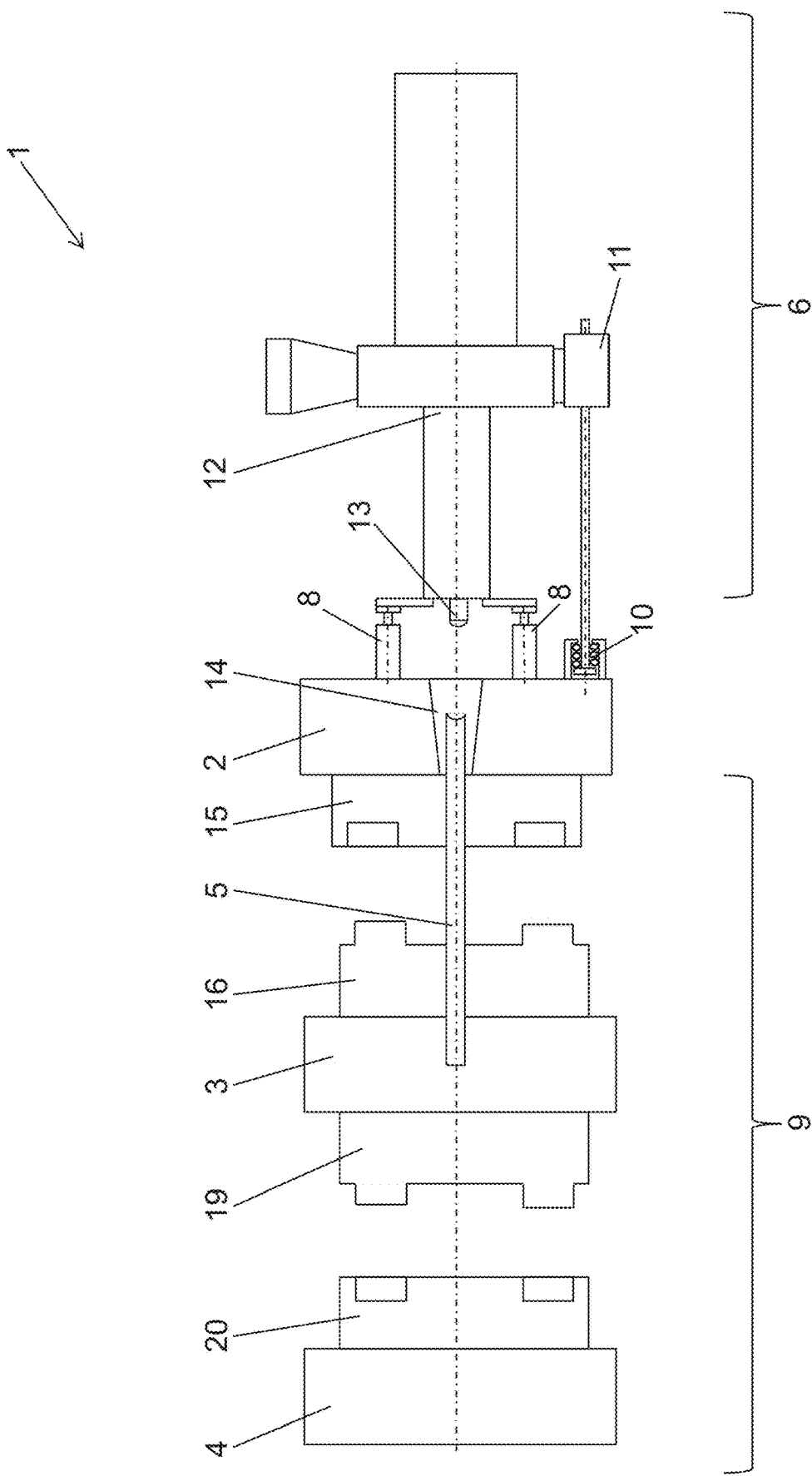

In a next step (as shown in FIG. 3b) plasticized molding material 7 is now injected by the injection unit 6, in which case the molding material 7 which is plasticized by the plasticizing cylinder 12 is injected by the injection nozzle 13 into the snorkel 5 which passes the molding material 7 to the second mold mounting plate 3. The arrangement has a hot runner system (not shown) which passes the molding material 7 coming from the snorkel 5 to the mold tool portions 16, 19. The molding material 7 is now passed through the mold tool portions 16, 19 into the cavities provided between the mold tool portions 19, 20 and the mold tool portions 15, 16.

In a next method step of the shaping cycle of the shaping machine 1 (shown in FIG. 3c) the stamping gap 17 between the mold tool portions 19, 20 and the stamping gap 17 between the mold tool portions 15, 16 is now closed by the closing unit 9. That relative movement (closure of the stamping gap 17 between the mold tool portions 15, 16) is compensated by the spring element 10 whereby the injection nozzle 13 still remains pressed against the snorkel 5. The spacing between the abutments 8 and the injection unit 6 however increases from the previously selected safety margin of 0.2 mm (this can be seen in FIGS. 3a and 3b) to a gap of 1 mm which is afforded by closure of the gap 17 of 0.8 mm and the safety margin of 0.2 mm. Upon closure of the stamping gap 17 of the closing unit 9 in that case the volume between the mold tool portions 19, 16 and the injection unit 6 remains unchanged.

In a last step in the shaping cycle the closing unit 9 is now opened again in order to be able to remove the components produced from the mold tools 15, 20. That opened condition of the closing unit 9 is clearly shown in FIG. 3d. The shaping cycle can then begin again from the start (FIG. 3a).

FIG. 4 shows a second embodiment of a shaping machine 1 according to the invention. The structure of the shaping machine 1 is substantially identical to that of the first embodiment shown in FIG. 1, with the exception of the arrangement of the abutments 8. In this embodiment there are no abutments 8 at a side of the first mold mounting plate 2, that is remote from the mold tool 15, but there is an abutment 8 at the spindle of the drive unit 11 of the injection unit 6. Precisely how that abutment can be designed will now be described hereinafter with reference to FIGS. 5a through 5c, wherein FIGS. 5a through 5c show adjustment of the abutment 8 of this embodiment shown in FIG. 4.

Figure 5A:
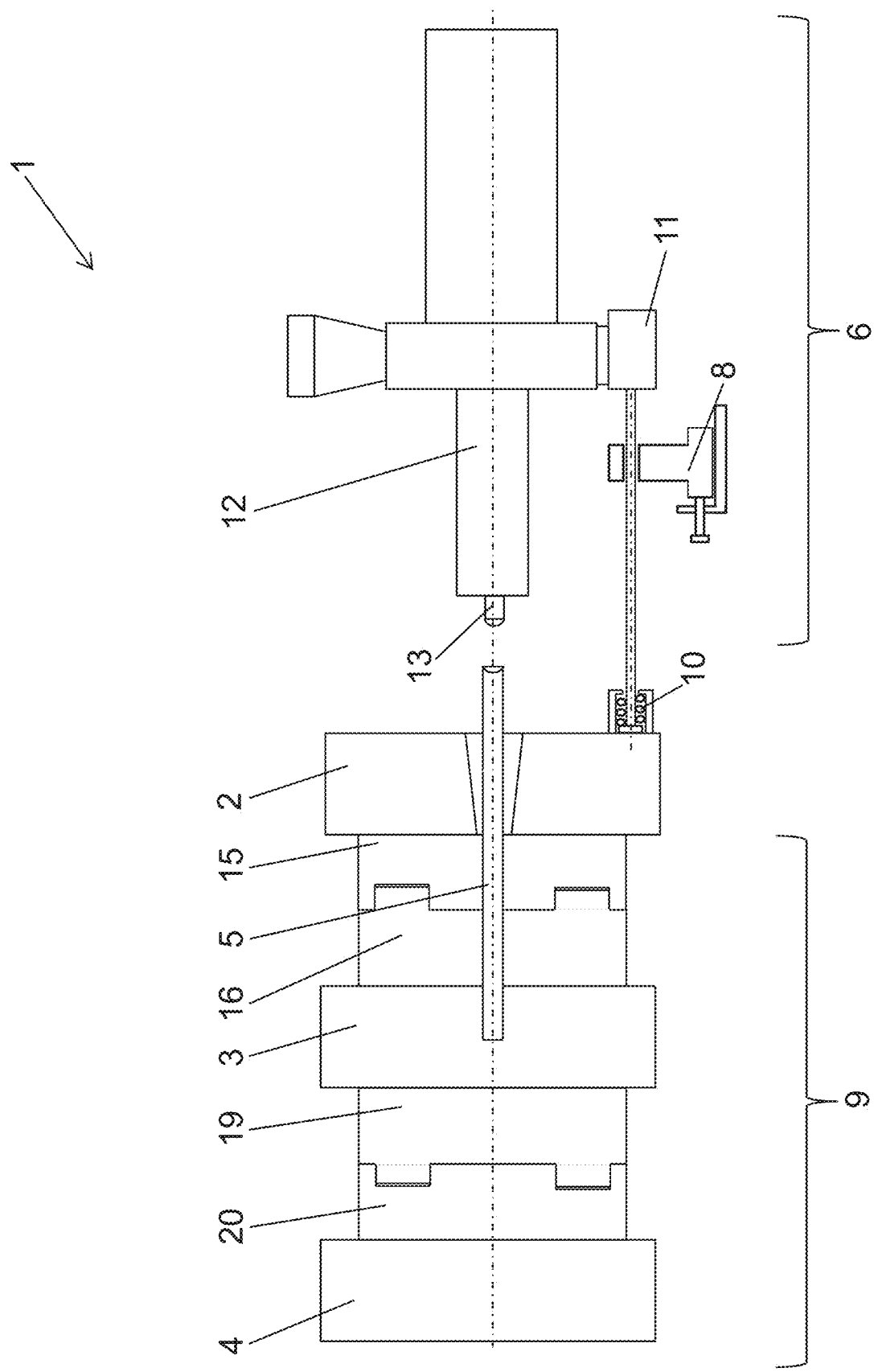

For that purpose firstly the closing unit 9 is completely closed until a mold tool portion 16 at the second mold mounting plate 3 bears against a mold tool portion 15 at the first mold mounting plate 2 and a mold tool portion 20 arranged at the further mold mounting plate 4 bears against a mold tool portion 19 disposed at the second mold mounting plate 3, as shown in FIG. 5a.

In a second method step for adjustment of the abutment 8 (shown in FIG. 5b) a gap dimension 18 is now adjusted between the abutment 8 and the injection unit 6 with the mold tool portions 15, 16 bearing against each other, by the length of the at least one abutment 8 being altered. More precisely here a gap dimension 18 of 1.0 mm is set, which is composed of a safety margin spacing of 0.2 mm and a stamping gap 17 of 0.8 mm.

In a last method step (to be seen in FIG. 5c) for adjustment of the abutment 8 of the shaping machine 1 the closing unit 9 is opened again, in which case now the injection unit 8 is biased against the abutment 8 by the spring elements 10.

The actual shaping cycle can be carried out similarly to FIGS. 3a through 3d.

LIST OF REFERENCES 1 shaping machine
2 first mold mounting plate
3 second mold mounting plate
4 further mold mounting plate
5 snorkel
6 injection unit
7 molding material
8 abutment
9 closing unit
10 spring element
11 drive unit
12 plasticizing cylinder
13 injection nozzle
14 opening
15 mold tool portion
16 mold tool portion
17 stamping gap
18 gap dimension
19 mold tool portion
20 mold tool portion

The invention claimed is:
1. A shaping machine comprising:
a closing unit which includes
a stationary first mold mounting plate,
a second mold mounting plate movable with respect to the first mold mounting plate, and
at least one tubular snorkel, wherein the at least one snorkel is fixedly secured to the second mold mounting plate; and an injection unit for plasticizing and injecting a molding material, wherein there is provided at least one abutment, the at least one abutment being configured such that in an opened condition of the closing unit the injection unit can be braced against the at least one abutment, and that in a closed condition of the closing unit the injection unit is freed from the at least one abutment by a force action of the at least one snorkel on the injection unit.

2. The shaping machine as set forth in claim 1, further comprising a third mold mounting plate movable with respect to the first mold mounting plate and/or the second mold mounting plate.

3. The shaping machine as set forth in claim 2, wherein the second mold mounting plate is arranged between the first mold mounting plate and the third mold mounting plate.

4. The shaping machine as set forth in claim 1, wherein the injection unit is biased by force actuation by means of at least one spring element.

5. The shaping machine as set forth in claim 4, wherein the at least one spring element is in the form of a mechanical and/or hydraulic spring element.

6. The shaping machine as set forth in claim 1, wherein the at least one abutment is provided at the first mold mounting plate.

7. The shaping machine as set forth in claim 1, wherein the at least one abutment has a bar-shaped configuration at a side of the first mold mounting plate that faces away from the second mold mounting plate.

8. The shaping machine as set forth in claim 1, wherein the at least one abutment has a multi-part configuration, wherein a length of the at least one abutment is variable by a relative movement of the parts of the at least one abutment relative to each other.

9. The shaping machine as set forth in claim 1, wherein the injection unit includes a drive unit configured to move the injection unit relative to the first mold mounting plate.

10. The shaping machine as set forth in claim 4, wherein the at least one spring element can be acted upon with a force by means of a drive unit of the injection unit.

11. The shaping machine as set forth in claim 1, wherein the injection unit is embodied by an axially and rotatably movable plasticizing screw, the plasticizing screw being arranged in a plasticizing cylinder.

12. The shaping machine as set forth in claim 11, wherein in the opened condition of the closing unit the injection unit can be braced directly or indirectly with the plasticizing cylinder against the at least one abutment.

13. The shaping machine as set forth in claim 1, wherein the injection unit has at least one injection nozzle, and wherein the at least one injection nozzle can be braced against the at least one snorkel.

14. The shaping machine as set forth in claim 1, wherein the at least one snorkel projects into an opening in the first mold mounting plate.

15. A method of operating a shaping machine, the shaping machine having
a closing unit which includes a stationary first mold mounting plate, a second mold mounting plate movable with respect to the first mold mounting plate, and at least one tubular snorkel fixedly secured to the second mold mounting plate,
an injection unit for plasticizing and injecting a molded material, and
at least one abutment, the method comprising:
bracing the injection unit against the at least one abutment in an opened condition of the closing unit;
closing the closing unit by displacement of the second mold mounting plate in a direction of the first mold mounting plate; and
upon closure of the closing unit lifting the injection unit off the at least one abutment by a force action of the at least one tubular snorkel on the injection unit.

16. The method as set forth in claim 15, further comprising, upon closure of the closing unit, introducing the at least one tubular snorkel arranged at the second mold mounting plate into an opening in the first mold mounting plate.

17. The method as set forth in claim 15, further comprising, upon opening of the closing unit, moving the second mold mounting plate together with the at least one snorkel in a direction facing away from the first mold mounting plate, whereby the biased injection unit which is lifted off the at least one abutment moves in the direction of the first mold mounting plate until the injection unit contacts the at least one abutment.

18. The method as set forth in claim 15, further comprising, in a shaping cycle of the shaping machine starting from an opened condition of the closing unit,
closing the second mold mounting plate in the direction of the first mold mounting plate by means of the closing unit, and
with the closing unit closed, feeding molding material by means of the injection unit by way of the at least one snorkel arranged at the second mold mounting plate to a mold tool arranged at the first mold mounting plate and at the second mold mounting plate.

19. The method as set forth in claim 18, further comprising, by means of the closing unit prior to the feeding of plasticized molding material, positioning a mold tool portion arranged at the second mold mounting plate so as to define a stamping gap relative to a mold tool portion arranged at the first mold mounting plate.

20. The method as set forth in claim 19, wherein a width of the stamping gap is selected to be between 1.6 mm and 0.2 mm.

21. The method as set forth in claim 19, further comprising, after the feeding of plasticized molding material, moving the second mold mounting plate in the direction of the first mold mounting plate by the closing unit.

22. The method as set forth in claim 15, further comprising, prior to the bracing of the injection unit against the at least one abutment, setting the at least one abutment arranged at a side of the first mold mounting plate that faces away from the second mold mounting plate, the setting of the at least one abutment comprising:
closing the closing unit until a mold tool portion arranged at the second mold mounting plate bears against a mold tool portion arranged at the first mold mounting plate;
adjusting a gap dimension between the at least one abutment and the injection unit, with the mold tool portions of the first and second mold mounting plates being in contact with each other, by altering a length of the at least one abutment; and
opening the closing unit.

23. The method as set forth in claim 22, wherein the gap dimension is between 0.1 mm and 0.4 mm plus a provided stamping gap.

* * * * *